United States Patent
Shin et al.

(10) Patent No.: US 11,415,802 B2
(45) Date of Patent: Aug. 16, 2022

(54) ELECTRONIC DEVICE USING AN AUGMENTED REALITY

(71) Applicant: LG ELECTRONICS INC., Seoul (KR)

(72) Inventors: Seungyong Shin, Seoul (KR); Kyoungtae Kim, Seoul (KR); Seong Jo, Seoul (KR); Changkyu Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 334 days.

(21) Appl. No.: 16/490,033

(22) PCT Filed: Aug. 2, 2019

(86) PCT No.: PCT/KR2019/009665
§ 371 (c)(1),
(2) Date: Aug. 29, 2019

(87) PCT Pub. No.: WO2021/025178
PCT Pub. Date: Feb. 11, 2021

(65) Prior Publication Data
US 2021/0333547 A1 Oct. 28, 2021

(51) Int. Cl.
*G02B 27/01* (2006.01)
*G02B 5/32* (2006.01)
(Continued)

(52) U.S. Cl.
CPC .......... *G02B 27/0172* (2013.01); *G02B 5/32* (2013.01); *G02B 6/005* (2013.01); *G02B 6/0023* (2013.01);
(Continued)

(58) Field of Classification Search
CPC .......... G02B 7/004; G02B 7/005; G02B 7/24; G02B 7/002; G02B 7/023; G02B 6/3604;
(Continued)

(56) References Cited

U.S. PATENT DOCUMENTS

| 6,091,546 | A * | 7/2000 | Spitzer | G02B 27/017 359/618 |
| 2012/0235900 | A1 * | 9/2012 | Border | G06F 3/011 345/156 |
| 2019/0212563 | A1 | 7/2019 | Schultz et al. | |

FOREIGN PATENT DOCUMENTS

| CN | 201417343 | 3/2010 |
| JP | 2019507365 | 3/2019 |

(Continued)

OTHER PUBLICATIONS

PCT International Application No. PCT/KR2019/009665, International Search Report dated Apr. 29, 2020, 3 pages.

*Primary Examiner* — Jade R Chwasz
(74) *Attorney, Agent, or Firm* — Lee Hong Degerman Kang & Waimey (57) ABSTRACT

Provided is an electronic device using a virtual reality, which is capable of self-aligning an in-coupling angle and an out-coupling angle by using a mechanical mechanism. An electronic device according to an aspect of the present invention includes: a glass body including a frame; an optical engine mounted on a leg of the frame and generating and emitting an image; an optical element mounted on the frame and performing in-coupling and out-coupling of the image emitted from the optical engine and displaying the corresponding image to a user; and a self alignment unit automatically aligning an in-coupling angle and an out-coupling angle of the optical element.

7 Claims, 7 Drawing Sheets

(51) Int. Cl.
*F21V 8/00* (2006.01)
*G02B 27/42* (2006.01)
(52) U.S. Cl.
CPC ....... *G02B 6/0088* (2013.01); *G02B 27/4205* (2013.01); *G02B 2027/014* (2013.01); *G02B 2027/0178* (2013.01)
(58) Field of Classification Search
CPC ...... G02C 5/20; G02C 5/2209; G02C 5/2272; G02C 5/229
USPC .................................................. 351/153, 111
See application file for complete search history.

(56) References Cited

FOREIGN PATENT DOCUMENTS

| | | | |
|---|---|---|---|
| KR | 1020170010042 | 1/2017 | |
| WO | WO-2017120346 A1 * | 7/2017 | ......... G02B 27/0172 |
| WO | 2019018396 | 1/2019 | |

* cited by examiner

ELECTRONIC DEVICE USING AN AUGMENTED REALITY

CROSS-REFERENCE TO RELATED APPLICATIONS

[0] This application is the National Stage filing under 35 U.S.C. 371 of International Application No. PCT/KR2019/009665, filed on Aug. 2, 2019, the contents of which are hereby incorporated by reference herein in its entirety.

TECHNICAL FIELD

The present invention relates to an electronic device using an augmented reality, and more particularly, to an electronic device using an augmented reality capable of self-aligning in-coupling angles and out-coupling angles.

BACKGROUND ART

An augmented reality (AR) is a technology that displays virtual objects overlapped with images and backgrounds of a reality. Unlike a virtual reality (VR) technology, in which objects, backgrounds, and environments are all made up of virtual images, the augmented reality technology mixes virtual objects in a real environment to provide additional information that a user feels more realistic in the real environment.

For example, when the user goes along a road and shines around with a camera of a digital device, the user may be provided with building information and road information included in a screen collected by the camera. Such an augmented reality technology has recently attracted more attention as the supply of portable devices and wearable devices (for example, glasses, etc.) has spread.

Electronic devices using such augmented reality generally include an optical system and the optical system is designed to perform in-coupling of a virtual image corresponding to digital or virtual objects and propagate the virtual image by total internal reflection (TIR) and then perform out-coupling of the virtual image to display the virtual image onto eyes of the user.

Therefore, in order to accurately display the virtual image to the user, the out-coupling angle at which the virtual image is emitted should be aligned with the in-coupling angle at which the virtual image is incident.

For this reason, glasses using the virtual reality have an alignment system for aligning the in-coupling angles and the out-coupling angles, whereas the glasses using the virtual reality in the related art have an alignment system using sensors and actuators.

Therefore, the glasses using the virtual reality in the related art is increasing the rigidity by using a metal member to secure a certain level of rigidity required by addition of the alignment system and for this reason, the glasses using the virtual reality in the related art has structural limitations in which a weight and a volume cannot be reduced.

DISCLOSURE

Technical Problem

In order to solve such a problem and an embodiment of the present invention provides an electronic device using a virtual reality which may self-align in-coupling angles and out-coupling angles by using a mechanical mechanism to configure a system with low cost by removing a separate sensor and a separator actuator for aligning and fixing a binocular optical system, implement a slim and light form factor by using a member which has lower rigidity than the existing scheme, and give a comfortable fit to a user.

Technical Solution

According to an aspect of the present invention, an electronic device using a virtual reality includes: a glass body including a frame; an optical engine mounted on a leg of the frame and generating and emitting an image; an optical element mounted on the frame and performing in-coupling and out-coupling of the image emitted from the optical engine and displaying the corresponding image to a user; and a self alignment unit automatically aligning an in-coupling angle and an out-coupling angle of the optical element.

The self alignment unit may adjust a rotation angle of the out-coupling angle to be smaller than the rotational angle of the in-coupling angle.

As an example, the self alignment unit may adjust the out-coupling angle so that the out-coupling angle rotates at θ when the in-coupling angle rotates at 2θ.

The self alignment unit may include a first gear and a second gear having a gear ratio of 2:1 and a third gear positioned between the first and second gears and matching rotational directions of the first gear and the second gear.

The self alignment unit may adjust the out-coupling angle by rotating the first gear according to rotational force of the second gear transmitted through the third gear.

The first gear may be a lens gear provided in the optical element, the third gear may be an idle gear coupled to the lens gear, and the second gear may be a temple gear coupled to the idle gear.

The frame may include a first shaft to which the lens gear is coupled, a second shaft to which the temple gear is coupled, and a third shaft to which the idle gear is coupled.

The optical element may include an in-coupler for the in-coupling and an out-coupler for the out-coupling.

The optical element may be configured by a diffractive optical element (DOE) or a hologram optical element (HOE).

The optical engine, the optical element, and the self alignment unit may be provided in two, respectively.

Advantageous Effects

According to such a configuration, the electronic device using the virtual reality of the present invention has a self alignment unit capable of automatically aligning the in-coupling angles and the out-coupling angles by a mechanical mechanism including a plurality of gears.

Therefore, an electronic device using a virtual reality can be provided, which can remove a separate sensor and a separator actuator for aligning and fixing a binocular optical system to configure a system with low cost, implement a slim and light form factor by using a member which has lower rigidity than the existing scheme, and give a comfortable fit to a user.

MODE FOR INVENTION

Hereinafter, exemplary embodiments of the present invention will be described in detail with reference to the attached drawings. Throughout the specification, like reference numerals denote substantially like components. In describing the present invention, a detailed description of known functions or configurations related to the present invention will be omitted when it is deemed that they may unnecessarily obscure the subject matter of the present invention. In describing various exemplary embodiments, descriptions of the same or like components will be given in the beginning but omitted in other exemplary embodiments.

Although terms including ordinal numbers such as "first" and "second" may be used to describe various components, the components are not limited by the terms. The terms are used only to distinguish one component from other components.

Hereinafter, 5G communication (5th generation mobile communication) required by an apparatus requiring AI processed information and/or an AI processor will be described through paragraphs A through D.

A. Example of Block Diagram of UE and 5G Network

Figure 1:
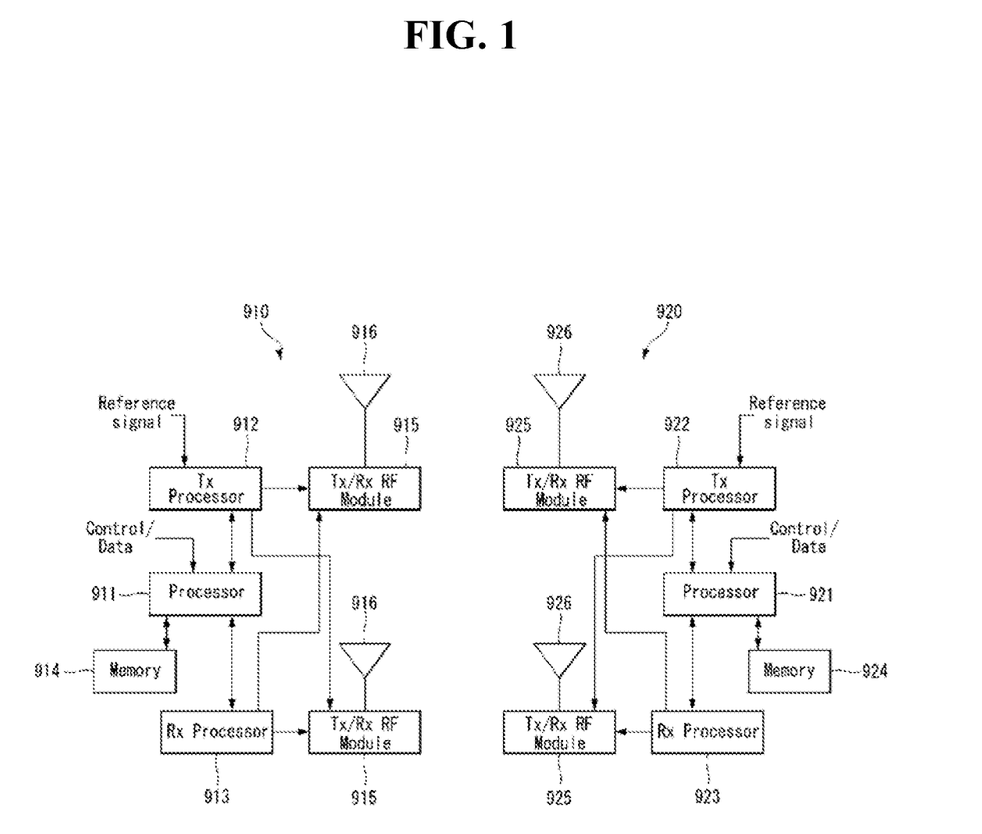
FIG. 1 illustrates a block diagram of a wireless communication device to which methods proposed by the present invention may be applied.

FIG. 1 is a block diagram of a wireless communication system to which methods proposed in the disclosure are applicable.

Referring to FIG. 1, a device (AI device) including an AI module is defined as a first communication device (910 of FIG. 1), and a processor 911 can perform detailed AI operation.

A 5G network including another device (AI server) communicating with the AI device is defined as a second communication device (920 of FIG. 1), and a processor 921 can perform detailed AI operations.

The 5G network may be represented as the first communication device and the AI device may be represented as the second communication device.

For example, the first communication device or the second communication device may be a base station, a network node, a transmission terminal, a reception terminal, a wireless device, a wireless communication device, a vehicle, a vehicle having an autonomous function, a connected car, a drone (Unmanned Aerial Vehicle, UAV), and AI (Artificial Intelligence) module, a robot, an AR (Augmented Reality) device, a VR (Virtual Reality) device, an MR (Mixed Reality) device, a hologram device, a public safety device, an MTC device, an IoT device, a medical device, a Fin Tech device (or financial device), a security device, a climate/environment device, a device associated with 5G services, or other devices associated with the fourth industrial revolution field.

For example, a terminal or user equipment (UE) may include a cellular phone, a smart phone, a laptop computer, a digital broadcast terminal, personal digital assistants (PDAs), a portable multimedia player (PMP), a navigation device, a slate PC, a tablet PC, an ultrabook, a wearable device (e.g., a smartwatch, a smart glass and a head mounted display (HMD)), etc.

For example, the HMD may be a display device worn on the head of a user. For example, the HMD may be used to realize VR, AR or MR.

For example, the drone may be a flying object that flies by wireless control signals without a person therein.

For example, the VR device may include a device that implements objects or backgrounds of a virtual world.

For example, the AR device may include a device that connects and implements objects or background of a virtual world to objects, backgrounds, or the like of a real world.

For example, the MR device may include a device that unites and implements objects or background of a virtual world to objects, backgrounds, or the like of a real world.

For example, the hologram device may include a device that implements 360-degree 3D images by recording and playing 3D information using the interference phenomenon of light that is generated by two lasers meeting each other which is called holography.

For example, the public safety device may include an image repeater or an imaging device that can be worn on the body of a user.

For example, the MTC device and the IoT device may be devices that do not require direct interference or operation by a person.

For example, the MTC device and the IoT device may include a smart meter, a bending machine, a thermometer, a smart bulb, a door lock, various sensors, or the like.

For example, the medical device may be a device that is used to diagnose, treat, attenuate, remove, or prevent diseases.

For example, the security device may be a device that is installed to prevent a danger that is likely to occur and to keep safety. For example, the security device may be a camera, a CCTV, a recorder, a black box, or the like.

For example, the Fin Tech device may be a device that can provide financial services such as mobile payment.

Referring to FIG. 1, the first communication device 910 and the second communication device 920 include processors 911 and 921, memories 914 and 924, one or more Tx/Rx radio frequency (RF) modules 915 and 925, Tx processors 912 and 922, Rx processors 913 and 923, and antennas 916 and 926.

The Tx/Rx module is also referred to as a transceiver. Each Tx/Rx module 915 transmits a signal through each antenna 926.

The processor implements the aforementioned functions, processes and/or methods. The processor 921 may be related to the memory 924 that stores program code and data. The memory may be referred to as a computer-readable medium.

More specifically, the Tx processor 912 implements various signal processing functions with respect to L1 (i.e., physical layer) in DL (communication from the first communication device to the second communication device).

The Rx processor implements various signal processing functions of L1 (i.e., physical layer).

UL (communication from the second communication device to the first communication device) is processed in the first communication device 910 in a way similar to that described in association with a receiver function in the second communication device 920.

Each Tx/Rx module 925 receives a signal through each antenna 926. Each Tx/Rx module provides RF carriers and information to the Rx processor 923.

The processor 921 may be related to the memory 924 that stores program code and data. The memory may be referred to as a computer-readable medium.

According to an embodiment of the present invention, the first communication device may be glasses, and the second communication device may be a 5G network.

B. Signal Transmission/Reception Method in Wireless Communication System

Figure 2:
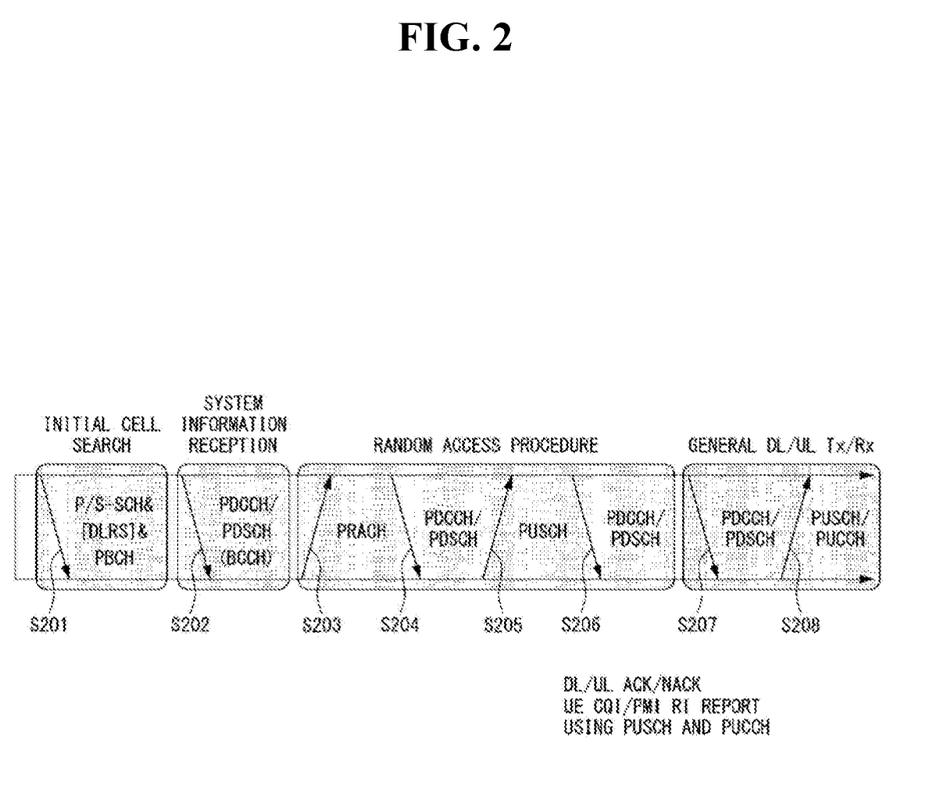
FIG. 2 is a diagram illustrating an example of a method for transmitting/receiving a signal in a wireless communication system.

FIG. 2 is a diagram showing an example of a signal transmission/reception method in a wireless communication system.

In a wireless communication system, a terminal receives information through a downlink (DL) from a base station, and the terminal transmits information through an uplink (UL) to the base station. The information transmitted and received between the base station and the terminal includes data and various control information, and various physical channels exist according to the type/use of the information transmitted and received.

When the terminal is powered on or enters a new cell, the terminal performs an initial cell search operation such as synchronizing with the base station (S201). For this operation, the terminal may receive a Primary Synchronization Signal (PSS) and a Secondary Synchronization Signal (SSS) from the base station to synchronize with the base station and obtain information such as a cell ID. Thereafter, the terminal may receive a physical broadcast channel (PBCH) from the base station to obtain broadcast information in a cell. Meanwhile, the terminal may check a downlink channel state by receiving a downlink reference signal (DL RS) in an initial cell search step.

After initial cell search, the terminal can acquire more detailed system information by receiving a physical downlink shared channel (PDSCH) according to a physical downlink control channel (PDCCH) and information included in the PDCCH (S202).

Meanwhile, when the terminal initially accesses the BS or has no radio resource for signal transmission, the terminal can perform a random access procedure (RACH) for the BS (steps S203 to S206). To this end, the terminal can transmit a specific sequence as a preamble through a physical random access channel (PRACH) (S203 and S205) and receive a random access response (RAR) message for the preamble through a PDCCH and a corresponding PDSCH. In the case of a contention-based RACH, a contention resolution procedure may be additionally performed (S206).

After the terminal performs the above-described process, the terminal can perform PDCCH/PDSCH reception (S207) and physical uplink shared channel (PUSCH)/physical uplink control channel (PUCCH) transmission (S208) as normal uplink/downlink signal transmission processes. Particularly, the terminal receives downlink control information (DCI) through the PDCCH. Here, the DCI includes control information such as resource allocation information for the terminal, and the format may be applied differently according to the purpose of use.

Meanwhile, the control information transmitted by the terminal to the base station through the uplink or received by the terminal from the base station is a downlink/uplink ACK/NACK signal, Channel Quality Indicator (CQI), Precoding Matrix Index (PMI), Rank Indicator (RI) and the like. The UE may transmit the above-described control information such as CQI/PMI/RI through PUSCH and/or PUCCH.

C. AI Basic Operation Using 5G Communication

Figure 3:
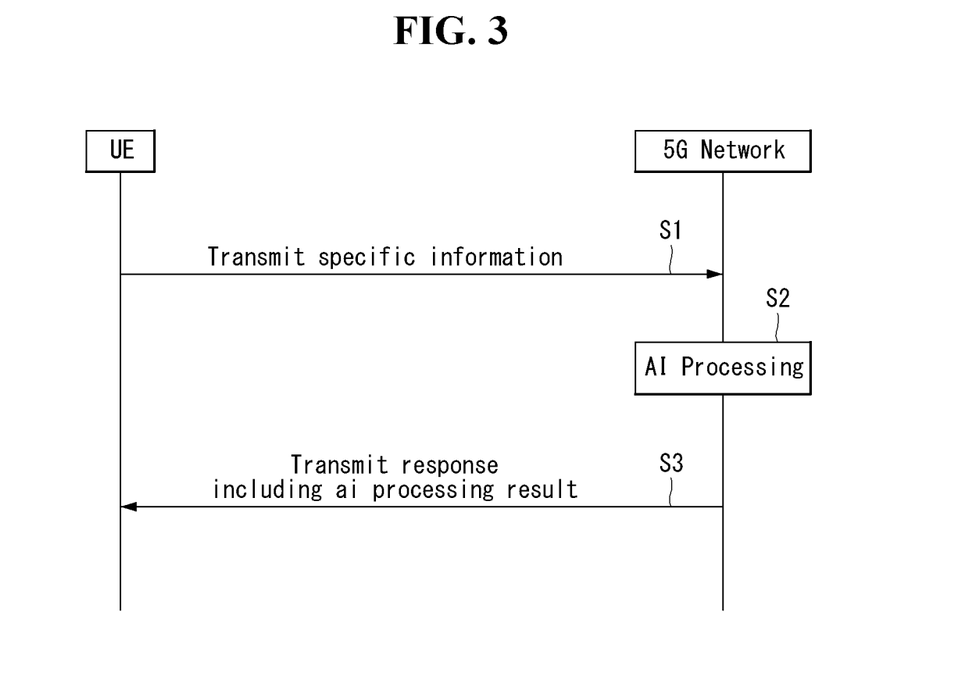
FIG. 3 is a diagram illustrating an example of basic operations of a user terminal and a 5G network in a 5G communication system.

FIG. 3 shows an example of basic operations of a terminal and a 5G network in a 5G communication system.

The UE transmits specific information transmission to the 5G network (S1). The 5G network performs 5G processing on the specific information (S2). Here, 5G processing may include AI processing. The 5G network transmits a response including the AI processing result to the UE (S3).

D. Applied Operations Between a Terminal and 5G Network in 5G Communication System Hereinafter, the AI operation using 5G communication will be described in more detail with reference to wireless communication technology (BM procedure, URLLC, mMTC, etc.) described in FIGS. 1 and 2.

As in steps S1 and S3 of FIG. 3, the UE performs an initial access procedure and a random access procedure with the 5G network prior to step S1 of FIG. 3 in order to transmit/receive signals, information and the like to/from the 5G network.

More specifically, the UE performs an initial access procedure with the 5G network on the basis of an SSB in order to acquire DL synchronization and system information.

A beam management (BM) procedure and a beam failure recovery procedure may be added in the initial access procedure, and quasi-co-location (QCL) relation may be added in a process in which the UE receives a signal from the 5G network.

In addition, the UE performs a random access procedure with the 5G network for UL synchronization acquisition and/or UL transmission.

The 5G network can transmit, to the UE, a UL grant for scheduling transmission of specific information. Accordingly, the UE transmits the specific information to the 5G network on the basis of the UL grant.

In addition, the 5G network transmits, to the UE, a DL grant for scheduling transmission of 5G processing results with respect to the specific information. Accordingly, the 5G network may transmit a response including the AI processing result to the UE based on the DL grant.

As described above, the UE can receive DownlinkPreemption IE from the 5G network after the UE performs an initial access procedure and/or a random access procedure with the 5G network.

Then, the UE receives DCI format 2_1 including a preemption indication from the 5G network on the basis of DownlinkPreemption IE.

The UE does not perform (or expect or assume) reception of eMBB data in resources (PRBs and/or OFDM symbols) indicated by the preemption indication.

Thereafter, when the UE needs to transmit specific information, the UE can receive a UL grant from the 5G network.

In step S1 of FIG. 3, the UE receives a UL grant from the 5G network in order to transmit specific information to the 5G network. Here, the UL grant may include information on the number of repetitions of transmission of the specific information and the specific information may be repeatedly transmitted on the basis of the information on the number of repetitions.

That is, the UE transmits the specific information to the 5G network on the basis of the UL grant. Repetitive transmission of the specific information may be performed through frequency hopping, the first transmission of the specific information may be performed in a first frequency resource, and the second transmission of the specific information may be performed in a second frequency resource.

The specific information can be transmitted through a narrowband of 6 resource blocks (RBs) or 1 RB.

The above-described 5G communication technology can be combined with methods proposed in the present invention which will be described later and applied or can complement the methods proposed in the present invention to make technical features of the methods concrete and clear.

Figure 4:
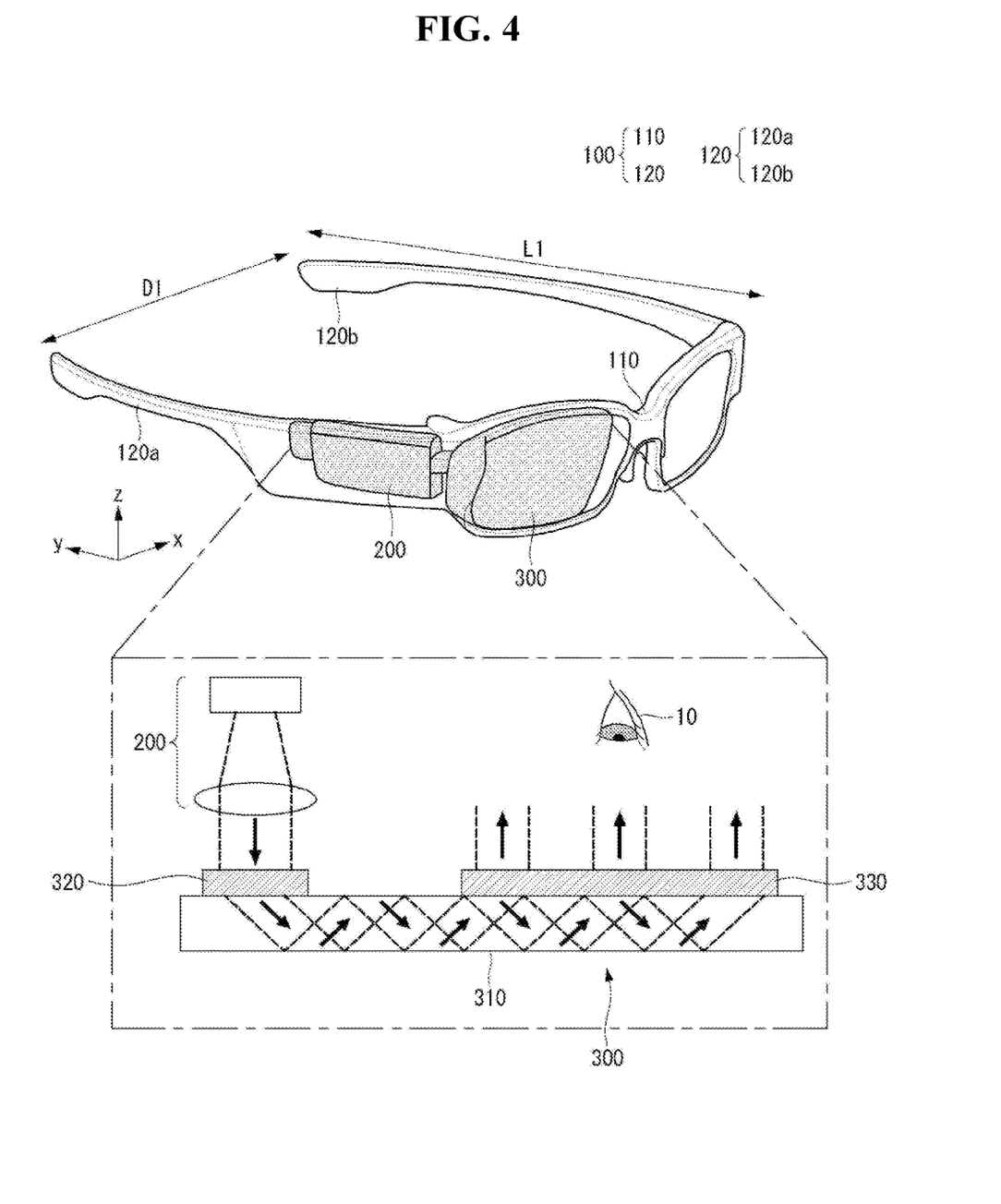
FIG. 4 is a diagram for describing an electronic device using a virtual reality according to an embodiment of the present invention.

FIG. 4 is a diagram for describing an electronic device using a virtual reality according to an embodiment of the present invention.

Figure 5:
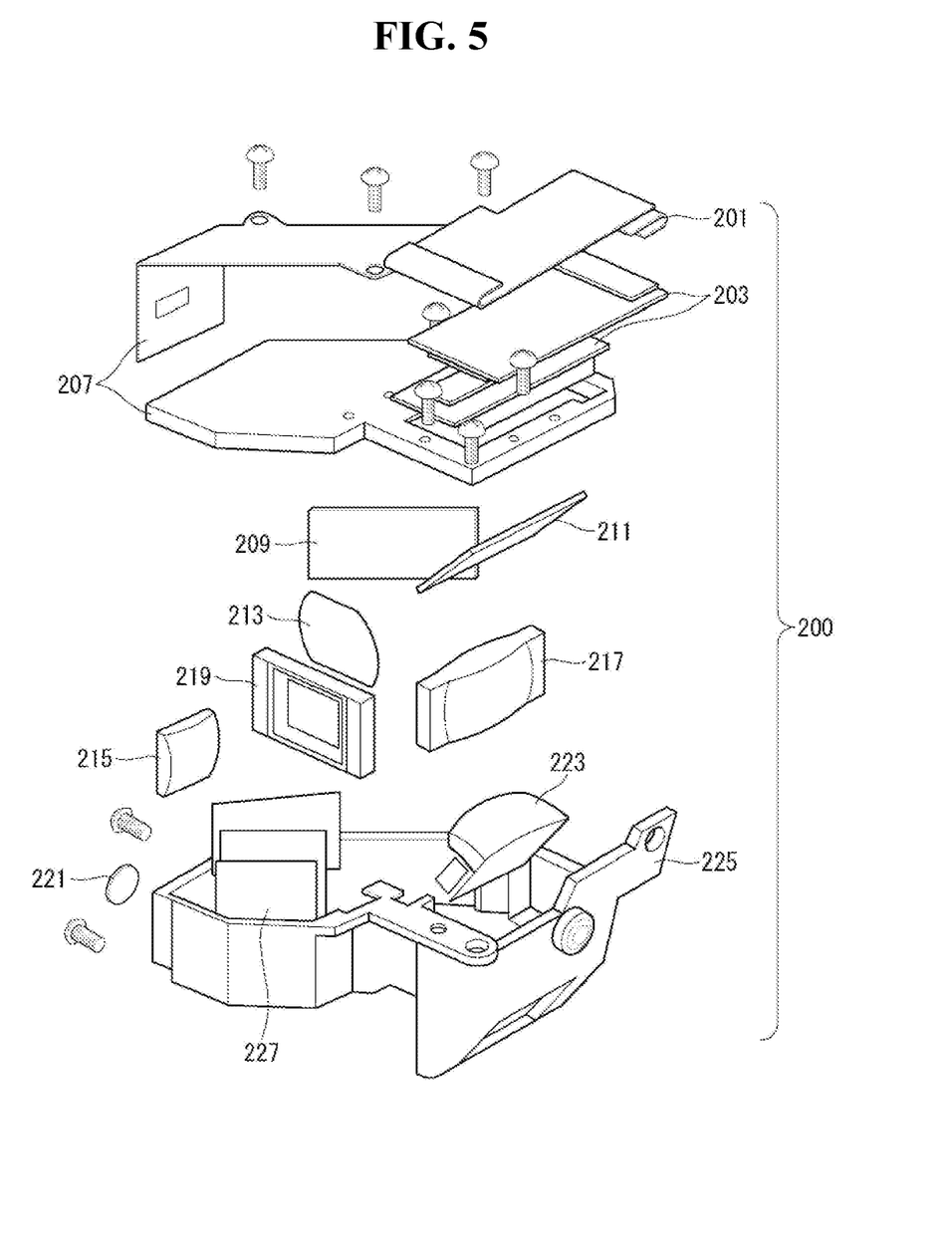
FIG. 5 is a diagram for describing an embodiment of an optical engine in FIG. 4.

As shown in FIG. 5, the electronic device according to one embodiment of the present invention may include a frame 100, an optical engine 200, and an optical element 300.

Although only the right eye optical engine and the right eye optical element are shown in FIG. 4, the binocular electronic device further includes a left eye optical engine and a left eye optical element.

In the following description, the right eye optical engine and the optical element are described, but the left eye optical engine may be configured in the same manner as the right eye optical engine, and the left eye optical element may be configured in the same manner as the right eye optical element.

As shown in the FIG. 4, the frame 100 may have a shape of glasses worn on the face of the user; however, the present invention is not limited to the specific shape and may have a shape such as goggles worn in close contact with the user's face.

The frame 100 may include a front frame 110 having at least one opening and one pair of a first and second side frames 120 parallel to each other and being extended in a first direction (y), which are intersected by the front frame 110.

The optical engine 200 may generate an image shown to the user or video comprising successive images. The optical engine 200 may include an image source panel that generates an image and a plurality of lenses that diffuse and converge light generated from the image source panel. A detailed structure of the optical engine 200 will be described in detail with reference to FIG. 5 below.

The optical engine 200 may be fixed to the inside or the outside of the first side frame 120a or may be integrally formed inside the side frame 120a.

The optical element 300 may serve to display an image generated by the optical engine 200 to the user 10, and allow the image to be displayed to the user 10, through the opening, and to the external environment. In order to be seen, it may be formed of a translucent glass material.

the optical element 300 may be fixed on the front surface 110 by being positioned on the rear surface of the opening (namely between the opening and the user's eye).

In the electronic device, as shown in FIG. 4, when the image light is incident on one side of the optical element 300 from the optical engine 200, the image light is emitted to the other side through the optical element 300. The image generated by the optical engine 200 may be displayed to the user 10.

Accordingly, the user 10 may view the external environment through the opening of the frame 100 and simultaneously view the image generated by the optical engine 200.

In order to cope with various head circumferences according to the human body characteristics of the user 10, the electronic device may have a structure in which at least one of the first length L1 of each of the first and second side frames 120 and the first gap D1 between the first and second side frame 120 may be adjusted. For example, at least one of the first length L1 and the first gap D1 may have a structure that may be increased or decreased.

FIG. 5 is a diagram for describing an embodiment of an optical engine in FIG. 4.

Referring to the figure, the optical engine 200 may include a first cover 207 and second cover 225 for protecting internal constituting elements and forming the external appearance of the optical engine 200, where, inside the first 207 and second 225 covers, included are a driving unit 201, image source panel 203, Polarization Beam Splitter Filter (PBSF) 211, mirror 209, a plurality of lenses 213, 215, 217, 221, Fly Eye Lens (FEL) 219, Dichroic filter 227, and Freeform prism Projection Lens (FPL) 223.

The first 207 and second 225 covers provide a space in which the driving unit 201, image source panel 203, PBSF 211, mirror 209, a plurality of lenses 213, 215, 217, 221, FEL 219, and FPL may be installed, and the internal constituting elements are packaged and fixed to either of the side frames 120.

The driving unit 201 may supply a driving signal that controls a video or an image displayed on the image source panel 203 and may be linked to a separate modular driving chip installed inside or outside the optical engine 200.

The driving unit 201 may be installed in the form of Flexible Printed Circuits Board (FPCB), which may be equipped with heatsink that dissipates heat generated during operation to the outside.

The image source panel 203 may generate an image according to a driving signal provided by the driving unit 201 and emit light according to the generated image. To this purpose, the image source panel 203 may use the Liquid Crystal Display (LCD) or Organic Light Emitting Diode (OLED) panel.

The PBSF 211 may separate light due to the image generated from the image source panel 203 or block or pass part of the light according to a rotation angle.

Therefore, for example, if the image light emitted from the image source panel 203 is composed of P wave, which is horizontal light, and S wave, which is vertical light, the PBSF 211 may separate the P and S waves into different light paths or pass the image light of one polarization or block the image light of the other polarization.

The PBSF 211 may be provided as a cube type or plate type in one embodiment.

The cube-type PBSF 211 may filter the image light composed of P and S waves and separate them into different light paths while the plate-type PBSF 211 may pass the image light of one of the P and S waves but block the image light of the other polarization.

The mirror 209 reflects the image light separated from polarization by the PBSF 211 to collect the polarized image light again and let the collected image light incident on a plurality of lenses 213, 215, 217, 221.

The plurality of lenses 213, 215, 217, 221 may include convex and concave lenses and for example, may include I-type lenses and C-type lenses.

The plurality of lenses 213, 215, 217, 221 repeat diffusion and convergence of image light incident on the lenses, thereby improving straightness of the image light rays.

The FEL 219 may receive the image light which has passed the plurality of lenses 213, 215, 217, 221 and emit the image light so as to improve illuminance uniformity and extend the area exhibiting uniform illuminance due to the image light.

The dichroic filter 227 may include a plurality of films or lenses and pass light of a specific range of wavelengths from the image light incoming from the FEL 219 but reflect light not belonging to the specific range of wavelengths, thereby adjusting saturation of color of the image light. The image light which has passed the dichroic filter 227 may pass through the FPL 223 and be emitted to the optical element 300.

The optical element 300 may receive the image light emitted from the optical engine 200 and emit the incident image light to the direction in which the user's eyes are located.

The optical element 300 may be fixed to the front frame 110 through a separate fixing member.

The optical element 300 may be translucent so as for the user 10 to visually recognize the external environment and recognize the image generated by the optical engine and may be made of a material such as the glasses.

As the optical element 300, a diffractive optical element (DOE) illustrated in FIG. 4 may be used. Although not illustrated, a hologram optical element (HOE) may be used as the optical element 300.

Hereinafter, a case where the diffractive optical element is used as the optical element 300 will be described as an example.

The diffractive optical element (DOE) includes an in-coupler 320 and an out-coupler 330 positioned on an inner surface (a surface facing the user 10) of a glass 310.

The couplers 320 and 330 may be provided in a form in which a specific pattern is patterned or a separate diffractive film is attached onto the surface of the glass 310.

In addition, the in-coupler 320 is positioned at a side on which an optical image is incident and the out-coupler 330 is positioned at a side from which the optical image is emitted.

As a result, the optical image generated by the optical engine 200 is diffracted while being incident through the in-coupler 320, totally reflected in the glass 310, and guided in the longitudinal direction of the glass 310 and emitted through the out-coupler 330 to be recognized by the vision of the user 10.

The electronic device according to an example of the present invention, which includes the optical engine 200 and the optical element 300 includes a self alignment unit 400 for automatically aligning an in-coupling angle of light which is incident on the in-coupler 320 and an out-coupling angle of light emitted through the out-coupler 330.

Figure 6:
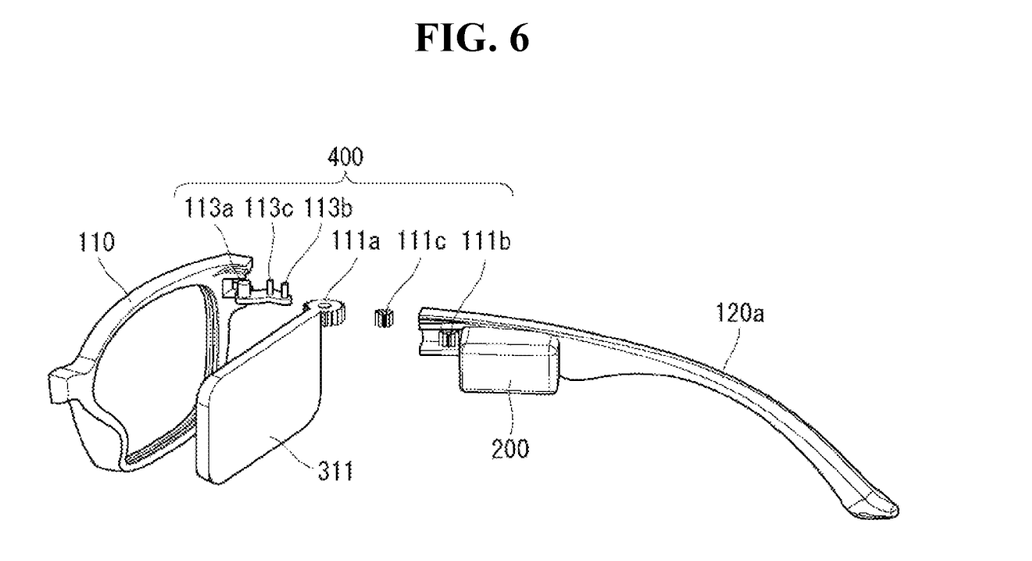
FIG. 6 is a diagram illustrating a configuration of a self alignment unit provided in an electronic device using a virtual reality according to an embodiment of the present invention.

Hereinafter, a configuration and an operation principle of the self alignment unit 400 will be described with reference to FIGS. 6 and 7.

The self alignment unit 400 according to an embodiment of the present invention is characterized to automatically align the out-coupling angle and the in-coupling angle by a mechanical mechanism.

The self alignment unit 400 according to the embodiment includes a first gear 111a, a second gear 111b, and a third gear 111c.

Here, the first gear 111a may be a lens gear fixed to a lens holder 311 to which the glass 310 is coupled, the third gear 111c may be an idle gear coupled to the lens gear 111a, and the second gear 111b may be a temple gear coupled to the idle gear 111c while being fixed to a side frame 120a.

The first gear 111a is coupled to a first shaft 113a provided in the frame 110. Accordingly, the first gear 111a may rotate clockwise or counterclockwise around the first axis 113a and when the first gear 111a rotates clockwise or counterclockwise, the lens holder 311 to which the first gear 111a rotates clockwise or counterclockwise around the first shaft 113a.

In addition, the second gear 111b is coupled to a second shaft 113b provided in the frame 110. Accordingly, the second gear 111b may rotate clockwise or counterclockwise around the second shaft 113b and when the side frame 120a rotates clockwise or counterclockwise around the second shaft 111b, the second gear 111b coupled to the second shaft 113b while being fixed to the side frame 120a rotates clockwise or counterclockwise around the second shaft 113b.

In addition, the third gear 111c is coupled to the third shaft 113c to transmit the rotational force of the second gear 111b to the first gear 111a and rotates in an opposite direction to the first gear 111a and the second gear 111b. Therefore, the third gear 111c may match the rotational direction of the first gear 111a with the rotational direction of the second gear 111b.

According to such a configuration, when the side frame 120a rotates counterclockwise around the second axis 113b, the second gear 111b rotates counterclockwise around the second axis 113b and the third gear 111c coupled to the second gear 111b rotates clockwise around the third shaft 113c.

Therefore, the first gear 111a coupled to the third gear 111c rotates counterclockwise around the first shaft 113a and the lens holder 311 to which the first gear 111a is fixed rotates counterclockwise around the first shaft 113a.

Therefore, the self alignment unit 400 rotates the first gear 111a by the rotational force of the second gear 111b transmitted through the third gear 111c to adjust the out-coupling angle in response to a change in in-coupling angle.

In order to adjust the out-coupling angle in response to the change in in-coupling angle, the first gear 111a and the second gear 111b has a gear ratio of 2:1.

Therefore, when the second gear 111b rotates at $2\theta$, the first gear 111a rotates by at $\theta$.

Figure 7:
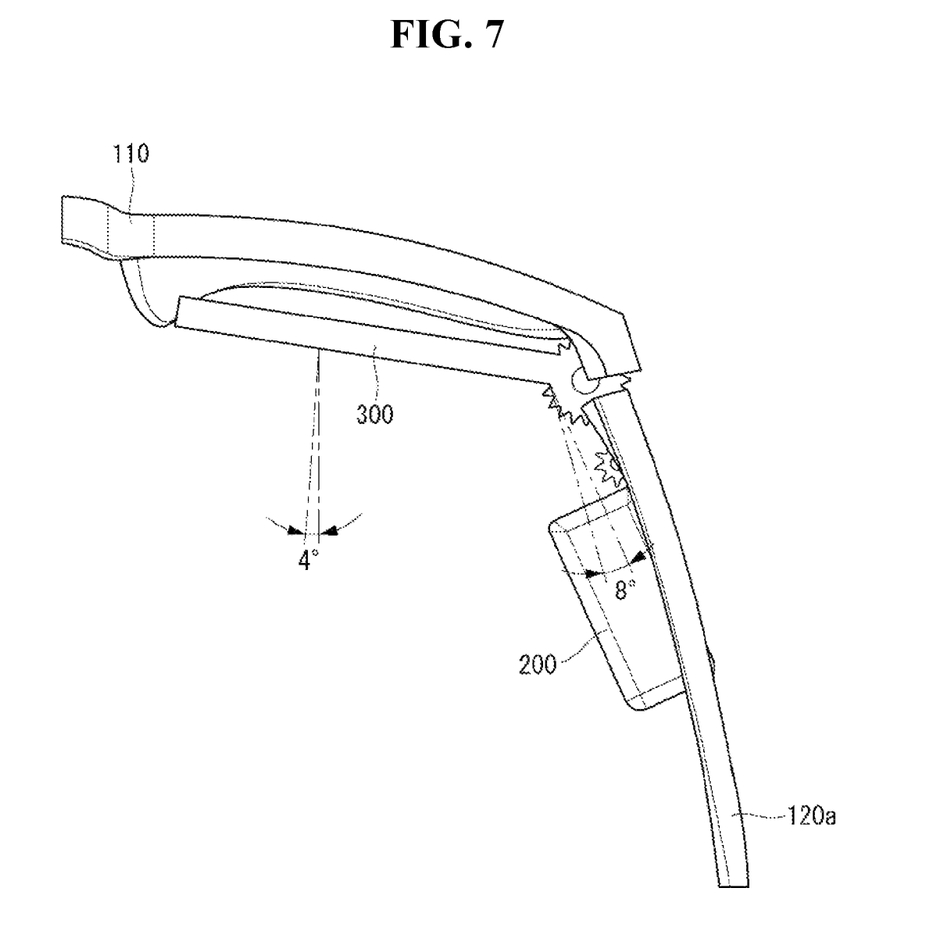
FIG. 7 is a conceptual view illustrating an operation principle of the self alignment unit illustrated in FIG. 6.

For example, as illustrated in FIG. 7, when the side frame 120a rotates at 8° counterclockwise, the in-coupling angle and the out-coupling angle are automatically self-aligned while the optical element 300 rotates at 4° clockwise by actions of the first to third gears.

Meanwhile, an elastic member may be added to a lens gear rotating body, an idle gear rotating body, and a temple gear rotating body so that the electronic device adheres well to a head of the user by the elastic member.

It will be apparent to those skilled in the art that various changes and modifications can be made without departing from the technical spirit of the present invention through contents described above. Therefore, the technical scope of the present invention should not be limited to the contents described in the detailed description of the specification but should be defined by the claims.

What is claimed is:
1. An electronic device using a virtual reality, comprising:
a glass body including a frame;
an optical engine mounted on a leg of the frame and generating and emitting an image;
an optical element mounted on the frame and performing in-coupling and out-coupling of the image emitted from the optical engine and displaying the corresponding image to a user; and
a self alignment unit automatically aligning an in-coupling angle and an out-coupling angle of the optical element, wherein the optical element mounted on the frame rotates automatically in conjunction with a rotation of the optical engine mounted on the leg, wherein the self alignment unit adjusts a rotation angle of the out-coupling angle to be smaller than a rotational angle of the in-coupling angle, wherein the self alignment unit adjusts the out-coupling angle so that the out-coupling angle rotates at $\theta$ when the in-coupling angle rotates at $2\theta$, and wherein the self alignment unit includes a first gear and a second gear having a gear ratio of 2:1 and a third gear positioned between the first and second gears and matching rotational directions of the first gear and the second gear.

2. The electronic device of claim 1, wherein the self alignment unit adjusts the out-coupling angle by rotating the first gear according to rotational force of the second gear transmitted through the third gear.

3. The electronic device of claim 2, wherein the first gear is a lens gear provided in the optical element, the third gear is an idle gear coupled to the lens gear, and the second gear is a temple gear coupled to the idle gear.

4. The electronic device of claim 3, wherein the frame includes a first shaft to which the lens gear is coupled, a second shaft to which the temple gear is coupled, and a third shaft to which the idle gear is coupled.

5. The electronic device of claim 1, wherein the optical element includes an in-coupler for the in-coupling and an out-coupler for the out-coupling.

6. The electronic device of claim 5, wherein the optical element is configured by a diffractive optical element (DOE) or a hologram optical element (HOE).

7. The electronic device of claim 6, further comprising:
two of the optical engine, two of the optical element, and two of the self alignment unit.

* * * * *